E. I. EMERSON.
LEAF SEPARATING DEVICE FOR LEAF SPRINGS.
APPLICATION FILED JAN. 4, 1913.
1,117,819.
Patented Nov. 17, 1914.
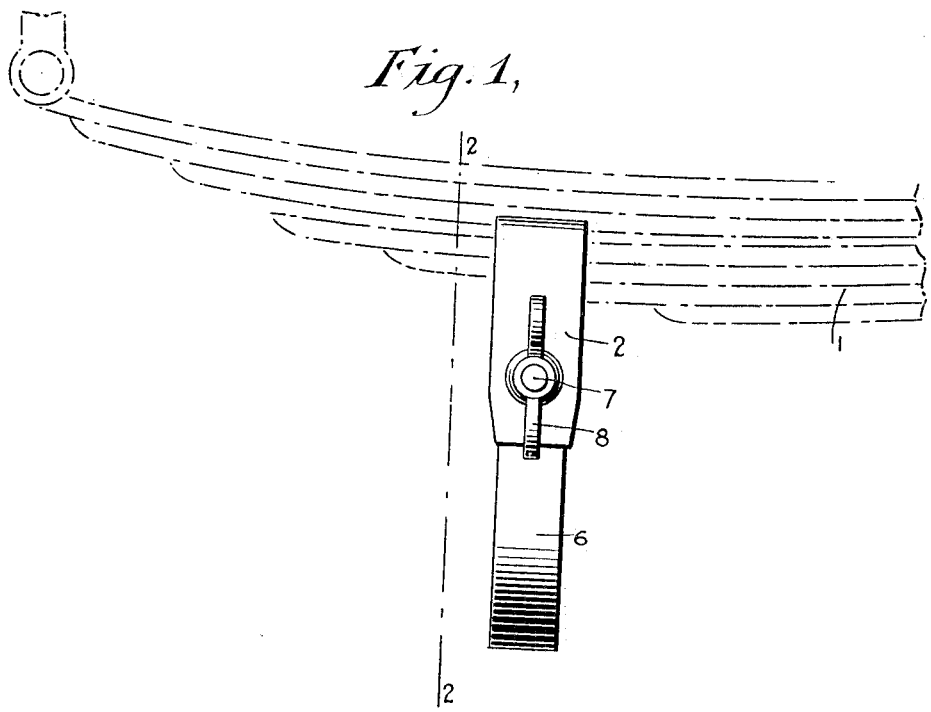
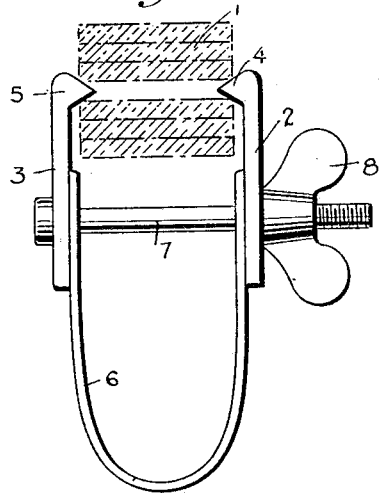
WITNESSES
Edward Thorpe
A. L. Kitchin
INVENTOR
Elmer I. Emerson
BY
ATTORNEYS

UNITED STATES PATENT OFFICE.

ELMER ISAIAH EMERSON, OF MONTGOMERY, NEW YORK.

LEAF-SEPARATING DEVICE FOR LEAF-SPRINGS.

1,117,819.  Specification of Letters Patent.  Patented Nov. 17, 1914.

Application filed January 4, 1913. Serial No. 740,136.

*To all whom it may concern:*

Be it known that I, ELMER I. EMERSON, a citizen of the United States, and a resident of Montgomery, in the county of Orange and State of New York, have invented a new and Improved Leaf-Separating Device for Leaf-Springs, of which the following is a full, clear, and exact description.

This invention relates to improvements in means for separating the leaves of flat or leaf springs, and has for an object the provision of an improved structure for spreading or moving apart the various leaves of a leaf spring in order that oil or other lubricant may be placed between the leaves.

Another object of the invention is to provide a readily operated tool formed with engaging points and a compression member for being forced between the leaves of any leaf spring so as to gain access to a point between said leaves.

In carrying out the objects of the invention, a pair of points or members are provided and connected with a spring or hinged connection of any kind, so that the entering points will be held in a certain relationship to each other, a spring being preferable, as the same normally holds the entering points apart. A clamping or binding member, as for instance, a bolt, is provided for causing the entering points to approach each other and to enter into the space between any two leaves of the leaf spring for spreading the same.

A practical embodiment of the invention is represented in the accompanying drawings forming a part of this specification, in which similar characters of reference indicate corresponding parts in both the views.

Figure 1 is a side view of a device embodying the invention, a fragmentary view of the leaf spring being shown in broken lines in connection therewith; and Fig. 2 is a section on line 2—2 of Fig. 1.

Referring to the accompanying drawings by numerals, 1 indicates any desired kind of a leaf spring which is formed of a plurality of leaves in the usual manner. During the use of springs of this character the same become more or less rusted and when used on automobiles and other outdoor vehicles a squeaking sound is produced. In order to avoid sounds of this character and to provide an easier, smoother action of the various leaves of the spring, oil or other lubricant is applied. In order to properly apply the oil or other lubricant, it is further desirable to spread the leaves temporarily, and in order to do this, a pair of wedge members 2 and 3 are provided, formed with entering points 4 and 5 designed to enter between any two leaves, as shown in Fig. 2, for spreading the leaves. The members 2 and 3 are made preferably of hard metal so as to retain the shape and be of sufficient strength to properly act on the leaves of the spring. In order that the members 2 and 3 may be held properly in place, the same are pivotally connected together, preferably by a spring 6 which tends to normally hold the members 3 and 4 spaced apart. A spring 6 has been disclosed for holding the members 2 and 3 in a certain relationship to each other, but it will be understood that the invention comprehends the use of any other desired means for accomplishing this purpose. The spring 6 may be connected to the members by any means, as for instance, by being welded thereto or secured in place by rivets. Preferably an aperture is provided in members 2 and 3, and also in spring 6, through which a bolt 7 is passed, which bolt is provided with a wing nut 8.

In operation, when it is desired, to oil a spring, the nut 8 is rotated so as to allow points 4 and 5 to be moved apart and then the points 4 and 5 are brought opposite the juncture between any two leaves and nut 8 tightened until the points 4 and 5 are moved to substantially the position shown in Fig. 2. The oil or other lubricant is then placed in position, after which the device is removed.

Having thus described my invention, I claim as new and desire to secure by Letters Patent:—

1. In a device of the character described, a pair of wedges adapted to be forced between the leaves of a leaf spring, a spring for resiliently connecting said wedges, and a clamping bolt for acting against said spring.

2. In a device of the character described, wedges adapted to be forced between the leaves of a leaf spring, means for connecting said wedges together so as to allow them to swing back and forth toward and from each other, a clamping bolt connected with said wedges and adapted to force the same toward each other.

3. In a device of the character described, a pair of wedges adapted to enter a leaf spring for spreading the leaves thereof, a bowed spring for holding said wedges in a predetermined position, and a clamping bolt for causing said wedges to enter between the leaves of said spring.

In testimony whereof I have signed my name to this specification in the presence of two subscribing witnesses.

ELMER ISAIAH EMERSON.

Witnesses:
DANIEL F. TAFT,
JENNIE M. PALEN.